US010352383B2

(12) United States Patent
Masuda et al.

(10) Patent No.: US 10,352,383 B2
(45) Date of Patent: Jul. 16, 2019

(54) ELECTRIC BRAKE DEVICE

(71) Applicant: NTN CORPORATION, Osaka (JP)

(72) Inventors: Yui Masuda, Iwata (JP); Tatsuya Yamasaki, Iwata (JP)

(73) Assignee: NTN CORPORATION, Osaka (JP)

( * ) Notice: Subject to any disclaimer, the term of this patent is extended or adjusted under 35 U.S.C. 154(b) by 25 days.

(21) Appl. No.: 15/394,112

(22) Filed: Dec. 29, 2016

(65) Prior Publication Data
US 2017/0108067 A1    Apr. 20, 2017

Related U.S. Application Data

(63) Continuation of application No. PCT/JP2015/069846, filed on Jul. 10, 2015.

(30) Foreign Application Priority Data

Jul. 18, 2014  (JP) .................. 2014-147668

(51) Int. Cl.
*F16D 65/18* (2006.01)
*B60T 13/74* (2006.01)
(Continued)

(52) U.S. Cl.
CPC .............. *F16D 65/18* (2013.01); *B60T 1/005* (2013.01); *B60T 13/74* (2013.01); *B60T 13/741* (2013.01);
(Continued)

(58) Field of Classification Search
CPC .. F16D 2121/24; F16D 65/18; F16D 2127/06; B60T 8/17; B60T 8/885;
(Continued)

(56) References Cited

U.S. PATENT DOCUMENTS 4,809,824 A * 3/1989 Fargier ............... B60T 8/32
188/72.8
6,231,133 B1 * 5/2001 Tsukamoto ......... B60T 8/326
303/115.2
(Continued)

FOREIGN PATENT DOCUMENTS

CN         1883979 A    12/2006
CN       101945787 A     1/2011
(Continued)

OTHER PUBLICATIONS

Decision of Grant dated Mar. 6, 2018, in corresponding Japanese Patent Application No. 2014-147668, 3 pgs.
(Continued)

*Primary Examiner* — Bradley T King
*Assistant Examiner* — Stephen M Bowes

(57) ABSTRACT

The electric brake device includes an electric motor, a brake rotor, a friction pad, a conversion mechanism, a braking force command section, a braking force estimation section, a controller, and a power supply device. The controller includes: a power determination section to determine whether an amount of remaining power that can be supplied from a power supply device to the electric motor has become equal to or less than a determined value; and a residual pressure cancellation section to cancel a residual pressure of a braking force by driving the electric motor in a direction opposite to a brake pressing direction such that an estimated value of the braking force obtained by the braking force estimation section becomes equal to or less than a set value, when the power determination section determines that the amount of remaining power has become equal to or less than the determined value.

4 Claims, 7 Drawing Sheets

(51) Int. Cl.
*B60T 17/18* (2006.01)
*B60T 1/00* (2006.01)
*F16D 55/226* (2006.01)
*F16D 63/00* (2006.01)
*F16D 55/225* (2006.01)
*F16D 121/24* (2012.01)
*F16D 125/48* (2012.01)
*F16D 125/40* (2012.01)
*F16D 127/02* (2012.01)

(52) U.S. Cl.
CPC ............ *B60T 17/18* (2013.01); *F16D 55/226* (2013.01); *F16D 63/006* (2013.01); *F16D 65/183* (2013.01); *F16D 55/225* (2013.01); *F16D 2121/24* (2013.01); *F16D 2125/40* (2013.01); *F16D 2125/48* (2013.01); *F16D 2127/02* (2013.01)

(58) Field of Classification Search
CPC ... B60T 8/92; B60T 8/88; B60T 8/741; B60T 8/746; B60T 17/22; B60T 2270/414
See application file for complete search history.

(56) References Cited

U.S. PATENT DOCUMENTS

| | | | |
|---|---|---|---|
| 6,702,405 B1* | 3/2004 | Balz | B60T 7/107 303/192 |
| 6,719,076 B1 | 4/2004 | Tabata et al. | |
| 7,419,229 B2 | 9/2008 | Higuchi et al. | |
| 7,810,616 B2 | 10/2010 | Nakazeki | |
| 8,864,244 B2 | 10/2014 | Leiber et al. | |
| 2003/0006726 A1* | 1/2003 | Weiberle | B60T 13/662 318/370 |
| 2003/0125863 A1* | 7/2003 | Tamasho | B60T 13/741 701/70 |
| 2005/0077783 A1 | 4/2005 | Suzuki et al. | |
| 2005/0269876 A1 | 12/2005 | Higuchi et al. | |
| 2006/0289210 A1 | 12/2006 | Yoshimi | |
| 2007/0068237 A1* | 3/2007 | Zumberge | B60T 13/741 73/121 |
| 2008/0110704 A1 | 5/2008 | Nakazeki | |
| 2009/0218179 A1* | 9/2009 | Yokoyama | B60T 13/741 188/1.11 L |
| 2011/0031072 A1 | 2/2011 | Leiber et al. | |
| 2011/0202246 A1* | 8/2011 | Lindsay | B60T 1/005 701/70 |
| 2014/0191627 A1* | 7/2014 | Takahashi | G01L 1/122 310/68 B |

FOREIGN PATENT DOCUMENTS

| | | |
|---|---|---|
| EP | 1 160 119 A1 | 12/2001 |
| JP | 6-327190 | 11/1994 |
| JP | 11-5520 | 1/1999 |
| JP | 2000-130482 | 5/2000 |
| JP | 2000-312444 | 11/2000 |
| JP | 2004-322987 | 11/2004 |
| JP | 2005-343397 | 12/2005 |
| JP | 2006-194356 | 7/2006 |
| JP | 2007-276725 | 10/2007 |
| JP | 2010-120522 | 6/2010 |

OTHER PUBLICATIONS

International Search Report dated Oct. 6, 2015 in corresponding International Application No. PCT/JP2015/069846.
International Preliminary Report on Patentability dated Feb. 2, 2017.
Extended European Search Report dated Mar. 28, 2018, in corresponding European Patent Application No. 15821790.1, 6 pgs.
Chinese Office Action dated Jun. 28, 2018 in related Chinese Patent Application No. 201580039049.0.

* cited by examiner

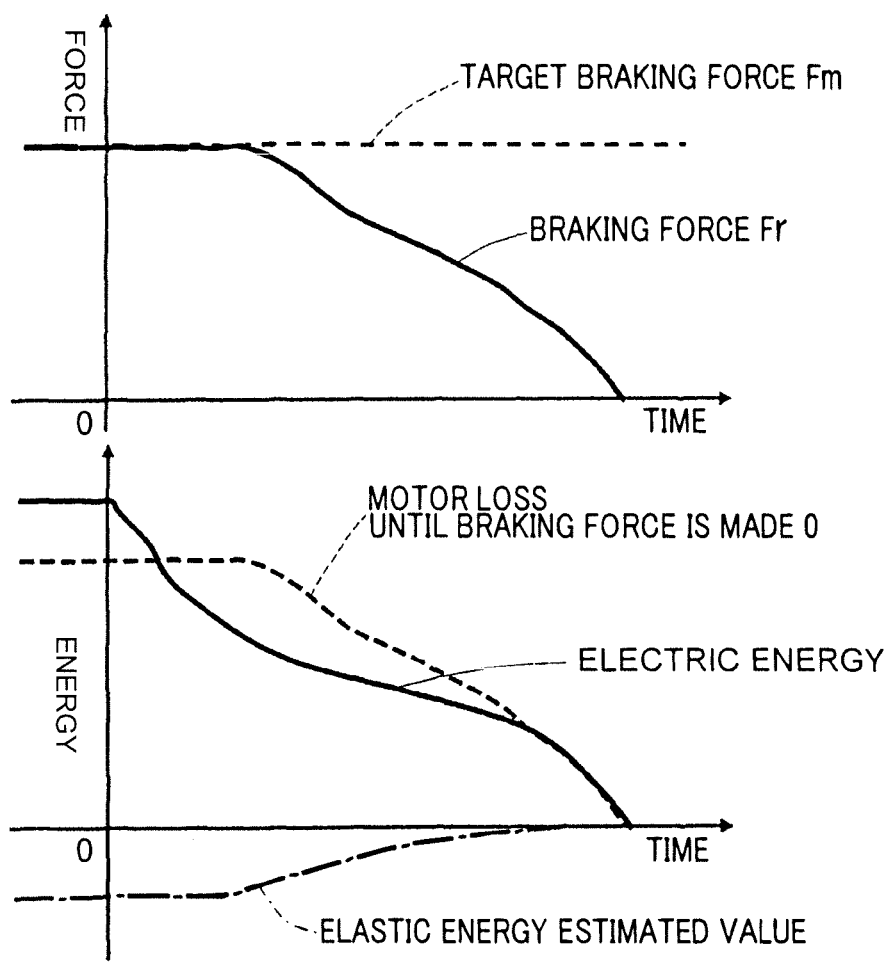

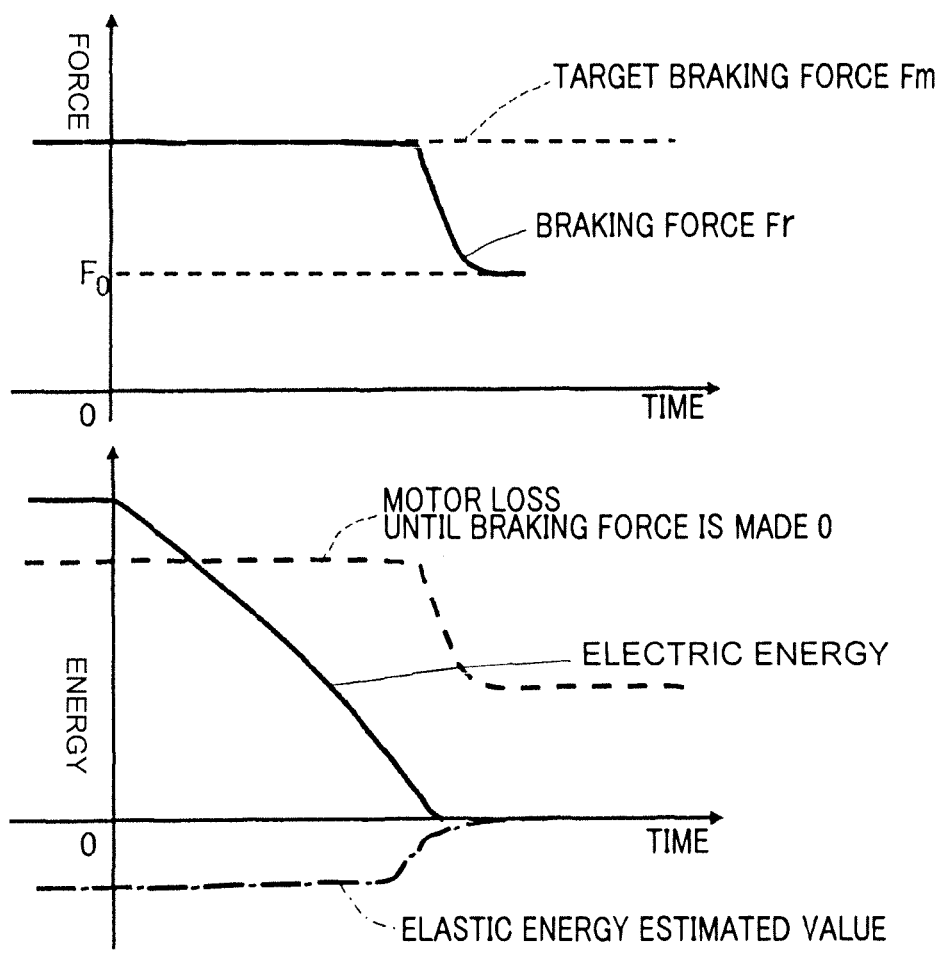
Related Art

ELECTRIC BRAKE DEVICE

CROSS REFERENCE TO THE RELATED APPLICATION

This application is a continuation application, under 35 U.S.C. § 111(a), of international application No. PCT/JP2015/069846, filed Jul. 10, 2015, which is based on and claims Convention priority to Japanese patent application No. 2014-147668, filed Jul. 18, 2014, the entire disclosure of which is herein incorporated by reference as a part of this application.

BACKGROUND OF THE INVENTION

Field of the Invention

The present invention relates to an electric brake device, and relates to, for example, a technique capable of cancelling a residual braking force generated when there is a breakage in a power line or a battery abnormality.

Description of Related Art

As an electric brake device, the following techniques have been proposed.

1. A technique to convert a rotary motion of a motor into a linear motion through a linear motion mechanism of an electric actuator by pressing a brake pedal and bring a brake pad into pressure contact with a brake disc, thereby applying a braking force (Patent Document 1).

2. An electric linear actuator in which a planetary roller screw mechanism is used (Patent Document 2).

RELATED DOCUMENT

Patent Document

[Patent Document 1] JP Laid-open Patent Publication No. H06-327190

[Patent Document 2] JP Laid-open Patent Publication No. 2006-194356

In the electric brake device at the above Patent Document 1. or 2., when an abnormality occurs in an electric motor due to, for example, a power line or battery abnormality, a residual braking force (hereinafter, referred to as a "residual pressure") may occur due to hysteresis caused by a frictional force within the actuator. If running is continued while the residual pressure occurs, there is a possibility that the gas mileage or electric mileage of a vehicle deteriorates due to occurrence of unintentional braking force in the vehicle. In addition, there is a possibility that excessive heat is generated in a brake rotor by a braking force caused by the residual pressure.

SUMMARY OF THE INVENTION

An object of the present invention to provide an electric brake device that cancels a residual pressure of a braking force, when there is an abnormality in a power supply device or the like, to prevent occurrence of unintentional braking force in a vehicle.

Hereinafter, in order to facilitate understanding of the present invention, the present invention will be described with reference to the reference numerals in embodiments for the sake of convenience.

An electric brake device according to the present invention includes: an electric motor 4; a brake rotor 8 configured to rotate integrally with a wheel; a friction pad 9 configured to come into contact with the brake rotor 8 to generate a braking force; a conversion mechanism 6 configured to convert a rotary motion of the electric motor 4 into an advancing or retracting motion of the friction pad 9; a braking force command section 18a configured to command a target braking force; a braking force estimation section 24 configured to obtain an estimated value of the braking force generated by pressing the friction pad 9 against the brake rotor 8; a controller 2 configured to drive the electric motor 4 such that the target braking force commanded by the braking force command section 18a is achieved; and a power supply device 30 configured to supply power (electric power) to each of the controller 2 and the electric motor 4, wherein the controller 2 includes:

a power determination section 28 configured to determine whether an amount of remaining power that can be supplied from the power supply device 30 to the electric motor 4 has become equal to or less than a determined value; and a residual pressure cancellation section 29 configured to cancel a residual pressure of the braking force by driving the electric motor 4 in a direction opposite to a brake pressing direction such that the estimated value of the braking force obtained by the braking force estimation section 24 becomes equal to or less than a set value, when the power determination section 28 determines that the amount of remaining power has become equal to or less than the determined value.

Each of the "determined value" and the "set value" is determined on the basis of a result of an experiment, simulation, or the like.

According to this configuration, the controller 2 controls the electric motor 4 in the brake pressing direction for pressing the brake, such that the target braking force commanded by the braking force command section 18a is achieved. The power supply device 3 supplies power to each of the controller 2 and the electric motor 4. The power determination section 28 determines whether the amount of remaining power that can be supplied to the electric motor 4 has become equal to or less than the determined value. An amount of remaining energy stored in the power supply device 3 needs to be detected for the power determination section 28. For example, in the case where the power supply device 3 is a battery, the power remaining in the power supply device 3 is managed by using a state-of-charge (abbreviated as SOC) obtained from the integral of a current or the like, and the state-of-charge corresponds to the amount of power. In addition, in the case where the power supply device 3 is, for example, a capacitor, the power remaining in the power supply device 3 is managed as a calculation value of $\frac{1}{2}*CV^2$ (C=capacitance, V=voltage), and the calculation value corresponds to the amount of power. When the power determination section 28 determines that the amount of remaining power that can be supplied to the electric motor 4 is greater than the determined value, the controller 2 controls driving of the electric motor 4 in the brake pressing direction such that the target braking force is achieved.

When the amount of remaining power for which the determination is performed by the power determination section 28 has become equal to or less than the determined value due to, for example, an abnormality in the main power supply device 3 or a power line L1, the residual pressure cancellation section 29 controls driving of the electric motor 4 in the direction opposite to the brake pressing direction such that the estimated value of the braking force obtained by the braking force estimation section 24 becomes equal to or less than the set value (e.g., a positive value close to zero).

In the case where the power supply device 3 is a battery, the power determination section 28 can determine that the amount of remaining power has become equal to or less than the determined value, when an amount of power obtained by integration of a current detected by a current sensor 31, etc. has decreased to a value that is equal to or less than a value obtained by multiplying, by a predetermined safety factor, a loss that occurs due to a residual pressure cancellation operation and that is obtained on the basis of friction loss, copper loss, iron loss, or the like, for example, in a predetermined residual pressure cancellation operation pattern. Accordingly, when there is an abnormality in the power supply device or the like, the residual pressure of the braking force can be cancelled to prevent occurrence of unintentional braking force in a vehicle equipped with the electric brake device, so that deterioration of the gas mileage or electric mileage of the vehicle can be prevented. In addition, generation of excessive heat in the brake rotor 8 is prevented to allow the vehicle to continue to run.

In the case where the vehicle includes a plurality of electric brake devices, generally, to ensure redundancy, each of the plurality of electric brake devices is conceivable of having power supply device 30 of different system from each other. Thus, in the vehicle, the present invention can be applied to the electric brake device that includes the electric motor 4 and the controller 2 connected to the power supply device 30 in which an abnormality has occurred, and the other electric brake device can be normally operated by the power supply device 30 of the above-mentioned different system.

The residual pressure cancellation section 29 may include:

an elastic energy estimated value determination section 32 configured to determine, on the basis of a rigidity and reverse efficiency of the electric brake device, an estimated value of elastic energy inputted to the electric motor 4 in a range in which the estimated value of the braking force obtained by the braking force estimation section 24 shifts from the target braking force to the set value or lower;

a motor loss estimated value calculation section 33 configured to obtain an estimated value of motor loss that occurs when a determined torque is continuously exerted in the range; and a comparison calculation section 34 configured to control the electric motor 4 such that the braking force is achieved which satisfies a condition that a sum of the estimated value of elastic energy determined by the elastic energy estimated value determination section 32 and the estimated value of motor loss calculated by the motor loss estimated value calculation section 33 does not exceed the amount of power for which the determination is performed by the power determination section 28.

The "rigidity" is determined, for example, on the basis of a correlation between a deformation amount of a brake caliper or the friction pad and an axial load of the conversion mechanism 6.

The "determined torque" is determined on the basis of the result of an experiment, simulation, or the like.

Here, regarding a correlation between a torque (x-axis line) of the electric motor 4 and a pressing force (y-axis line) of the friction pad 9 exerted by the rotary motion of the electric motor 4, for example, as the motor torque increases, the pressing force of the friction pad 9 increases according to a forward or positive efficiency line. After this operation, when the motor torque turns to decrease, the pressing force of the friction pad 9 decreases according to a line of the reverse efficiency. On the reverse efficiency line, a pressing force $F_0$ of the friction pad at a torque $\tau_0$ generated when there is an abnormality in the power supply device 3 or the like is a residual pressure which occurs when there is the abnormality.

The elastic energy inputted to the electric motor 4 depends on the rigidity and the area surrounded by the reverse efficiency line, a straight line extending from a point thereon corresponding to a predetermined motor torque to zero and parallel to the x-axis line, and the y-axis line. Thus, for example, in advance, a test, an experiment, simulation calculation, or the like is performed to determine the rigidity and a correlation between the motor torque and the pressing force, and a table or a map for estimating the elastic energy is created. The elastic energy estimated value determination section 32 can estimate the elastic energy by converting the estimated braking force to a pressing force and checking the pressing force against the map to obtain a motor torque and a deformation amount of a brake caliper or the friction pad. The motor loss estimated value calculation section 33 can estimate the estimated value of motor loss, for example, on the basis of: an external force required for rotating the electric motor 4 in a brake releasing direction for releasing the brake when there is an abnormality in the power supply device 3 or the like; and a motor rotation angle required until the braking force is reduced to about zero or lower. The comparison calculation section 34 controls the electric motor 4 such that the braking force is achieved which satisfies the condition that the aforementioned sum of the estimated value of elastic energy and the estimated value of motor loss does not exceed the amount of power for which the determination is performed by the power determination section 28. Thus, the braking force can be assuredly reduced to about zero or lower.

The motor loss estimated value calculation section 33 may estimate the estimated value of motor loss on the basis of a motor rotation angle in the range, a maximum value of a cogging torque of the electric motor 4, and a determined rolling friction resistance value. The motor rotation angle is detected by, for example, an angle sensor 26 provided to the electric motor 4. The "rolling friction resistance value" is determined, for example, on the basis of the result of a test, simulation, or the like.

There is a possibility that a residual pressure occurs due to fluctuations in a parameter such as the rolling resistance of the electric motor 4. As a countermeasure against this, the residual pressure cancellation section 29 may be additionally provided with a threshold for an emergency residual pressure cancellation in which the electric motor 4 is caused to monotonously rotate in a brake releasing direction for releasing the brake when the amount of power for which the determination is performed by the power determination section 28 has become equal to or less than the determined value. The "threshold" is determined, for example, on the basis of the result of a test, simulation, or the like. In this case, the residual pressure of the braking force can be cancelled, and also a load of arithmetic processing on the controller 2 can be reduced by simplifying a control system.

The power supply device 30 may include a main power supply device 3 to be mainly used and a sub-power supply device 21 to be used in cancelling the residual pressure of the braking force, and when the power determination section 28 determines that the amount of remaining power to be supplied from the main power supply device 3 to the electric motor 4 has become equal to or less than the determined value, the residual pressure cancellation section 29 may break a connection with the main power supply device 3, and may drive the electric motor 4 by using power remaining in the sub-power supply device 21, to cancel the residual pressure of the braking force.

Since the residual pressure of the braking force is cancelled by using the sub-power supply device 21 different from the main power supply device 3 as described above, redundancy can be ensured.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIG. 6A is a diagram showing an operation example of the electric brake device at time of a power supply abnormality;

FIG. 6B is a diagram showing an operation example of an electric brake device of a conventional art example at time of a power supply abnormality;

DESCRIPTION OF EMBODIMENTS

Figure 1:
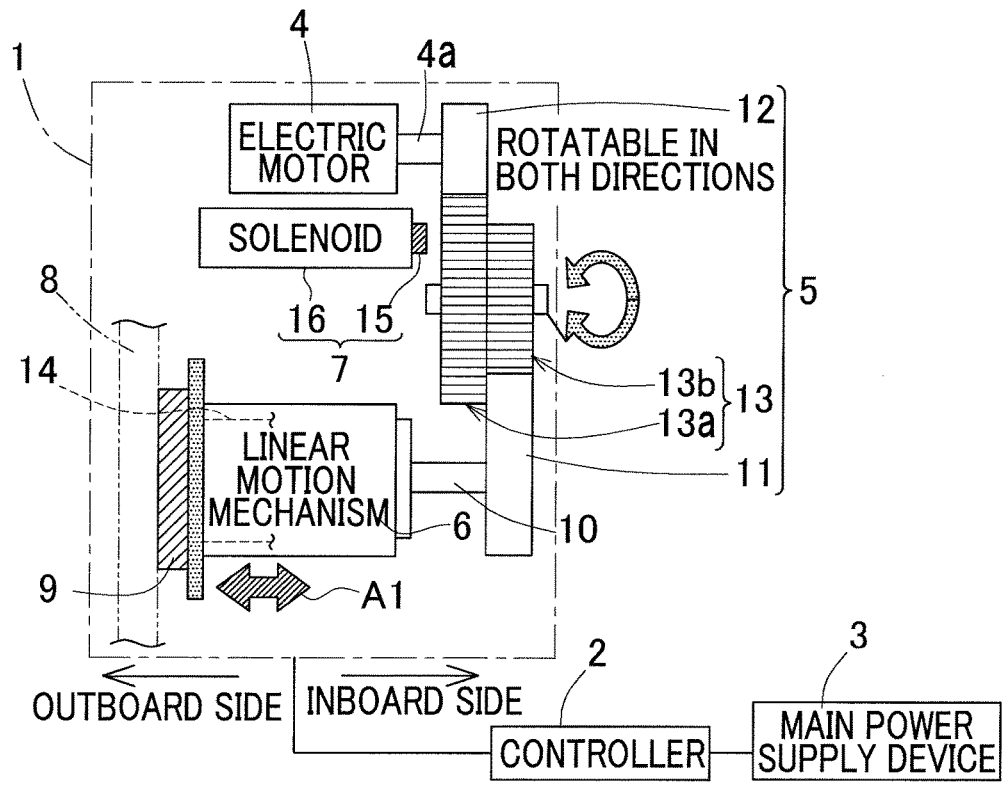
FIG. 1 is a diagram schematically showing an electric brake device according to an embodiment of the present invention.

An electric brake device according to an embodiment of the present invention will be described with reference to FIGS. 1 to 7. As shown in FIG. 1, the electric brake device includes an electric actuator 1, a controller 2, and a main power supply device 3. The electric actuator 1 includes an electric motor 4, a speed reduction mechanism 5 that reduces a speed of rotation, or a number of rotation per unit time, of the electric motor 4, a linear motion mechanism (conversion mechanism) 6, a parking brake mechanism 7 that makes a parking brake, a brake rotor 8, and a friction pad 9. The electric motor 4, the speed reduction mechanism 5, and the linear motion mechanism 6 are incorporated in, for example, a housing that is not shown, or the like.

The speed reduction mechanism 5 includes a primary gear 12, an intermediate gear 13, and a tertiary gear 11 and is a mechanism that reduces the speed of rotation of the electric motor 4 and transmits the reduced rotation to the tertiary gear 11 fixed to a rotation shaft 10. In this example, the speed reduction mechanism 5 is able to reduce, by the intermediate gear 13, the speed of rotation of the primary gear 12 mounted on a rotor shaft 4a of the electric motor 4 and transmit the reduced rotation to the tertiary gear 11 fixed to an end portion of the rotation shaft 10. The intermediate gear 13 is a gear obtained by integrally and coaxially molding of an outboard-side gear 13a (FIG. 1) and an inboard-side gear 13b (FIG. 1) having a smaller number of teeth than the gear 13a.

The linear motion mechanism 6 is a mechanism that converts the rotary motion outputted from the speed reduction mechanism 5 into a linear motion of a linear motion portion 14 by a feed screw mechanism and brings the friction pad 9 into contact with the brake rotor 8 or separates the friction pad 9 from the brake rotor 8. The linear motion portion 14 is supported within the linear motion mechanism 6 such that the linear motion portion 14 is prevented from rotating and is movable in an axial direction shown by an arrow A1. The friction pad 9 is provided at an outboard-side end of the linear motion portion 14. Rotation of the electric motor 4 is transmitted to the linear motion mechanism 6 through the speed reduction mechanism 5, thereby converting the rotary motion into the linear motion, and the linear motion is converted to a pressing force of the friction pad 9, thereby generating a braking force in the brake rotor 8 which rotates integrally with a wheel (not shown).

The parking brake mechanism 7 is configured to be able to switch between: a parking lock state in which a reduction of a braking force of the electric actuator 1 is inhibited; and an unlock state in which the reduction of the braking force is allowed. The parking brake mechanism 7 includes a lock member 15 and an actuator 16 that drives switching of the lock member 15.

Figure 2:
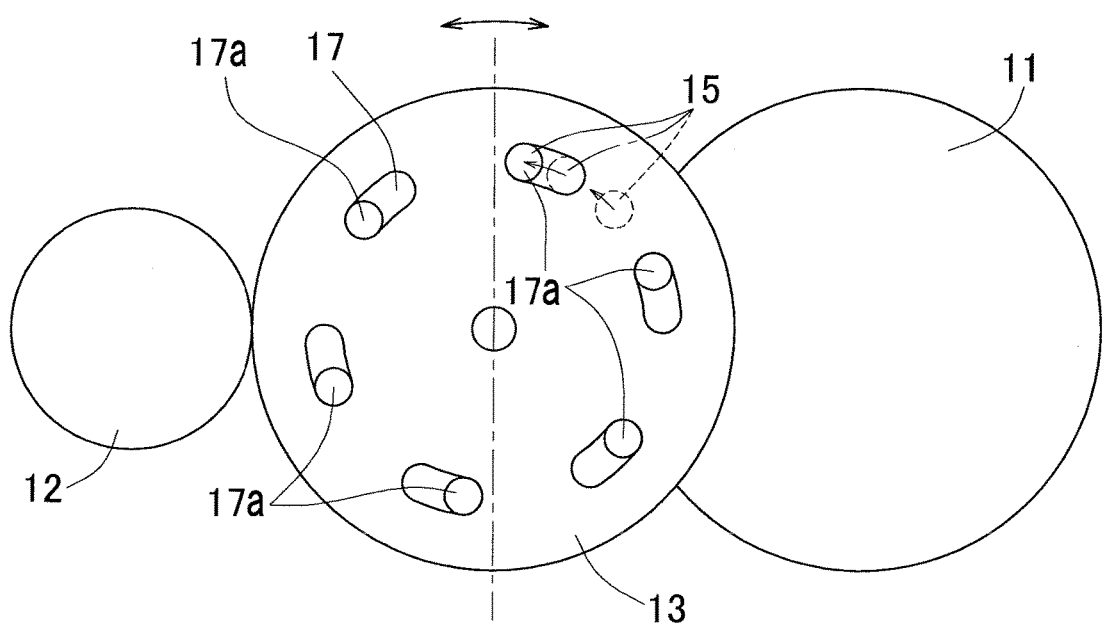
FIG. 2 is a plan view schematically showing a main part of a parking brake mechanism of the electric brake device.

FIG. 2 is a side view schematically showing a main part of the parking brake mechanism as seen in a direction along the rotor shaft 4a and the rotation shaft 10 in FIG. 1. In the outboard-side end surface of the intermediate gear 13 in FIG. 2, a plurality (six in this example) of locking holes 17 are formed at regular intervals in the circumferential direction thereof. Each locking hole 17 is formed in an oblong hole shape extending along the circumferential direction. The lock member 15 is configured to be able to be brought into engagement with any one of these locking holes 17.

For example, a linear solenoid is used as the actuator 16 (FIG. 1). The lock member (solenoid pin) 15 is advanced by the actuator 16 (FIG. 1) to be fitted into a bottomed cylindrical hole portion 17a of the locking hole 17, which is formed in the intermediate gear 13, whereby the lock member 15 is brought into engagement with the locking hole 17 to prevent rotation of the intermediate gear 13, thereby obtaining the parking lock state. In addition, a part or the entirety of the lock member 15 is retracted into the actuator 16 (FIG. 1) to be disengaged from the locking hole 17, whereby rotation of the intermediate gear 13 is allowed, thereby obtaining the unlock state.

Figure 3:
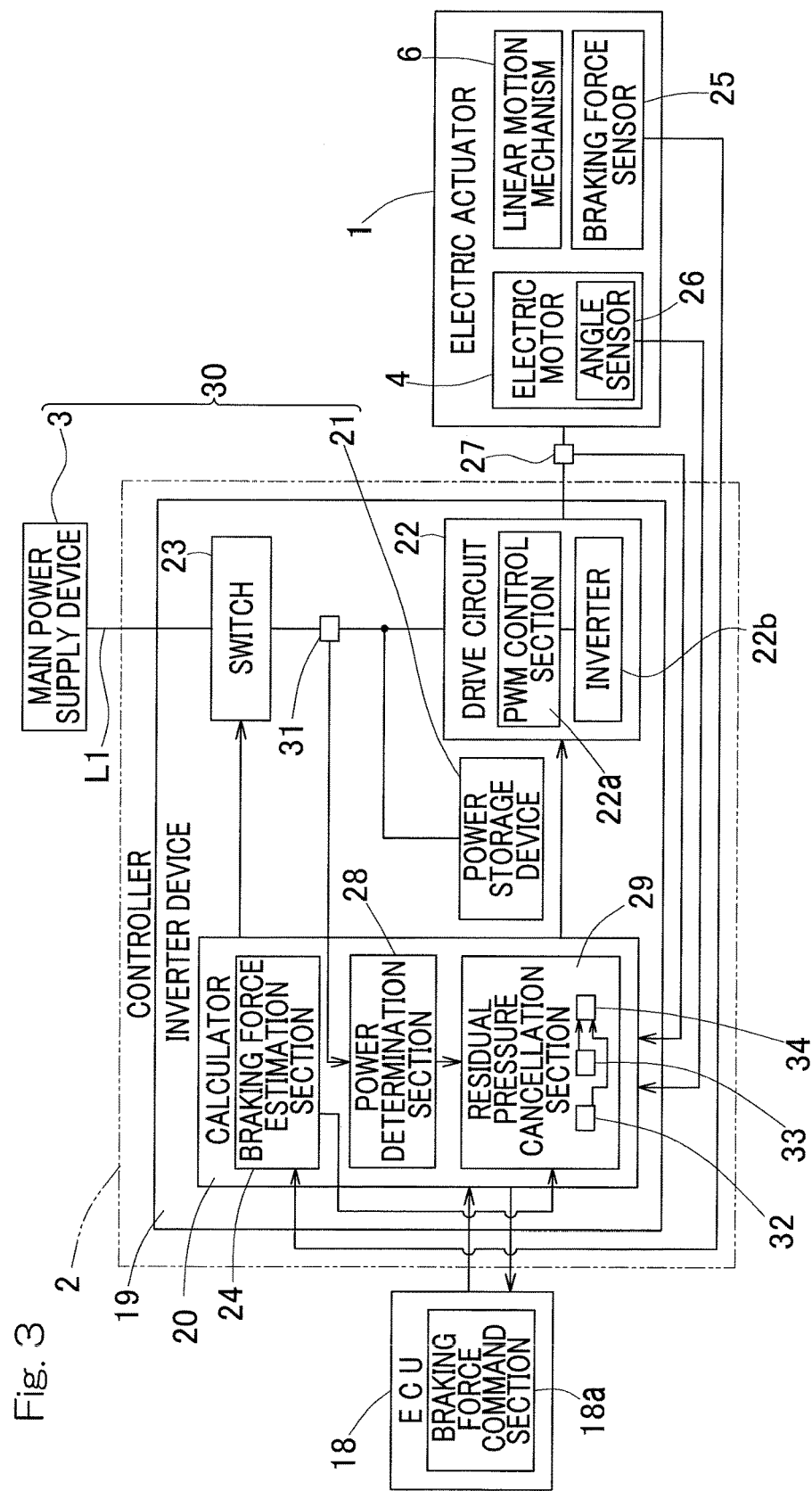
FIG. 3 is a block diagram showing a schematic configuration of a control system of the electric brake device.

FIG. 3 is a block diagram showing a schematic configuration of a control system of the electric brake device. The controller 2 of the electric brake device includes an inverter device 19 connected to an ECU (VCU) 18. The ECU 18 is provided with a braking force command section 18a. For example, an electric control unit that performs overall control of a vehicle is used as the ECU 18 which is higher-order control unit of the inverter device 19. In response to an output of a sensor (not shown) that varies according to, for example, an operation amount of a brake pedal, a brake button, a brake lever, or the like that is not shown, the braking force command section 18a commands a target braking force by using a LUT (Look Up Table) implemented by software or hardware, or a predetermined transform function contained in a library of software or hardware equivalent to this, etc.

The inverter device 19 includes a calculator 20, a power storage device 21, a drive circuit 22, a switch 23, etc. The calculator 20 includes a braking force estimation section 24. The braking force estimation section 24 obtains an estimated value of the braking force that is generated by pressing the friction pad 9 (FIG. 1) against the brake rotor 8 (FIG. 1). As shown in FIG. 3, the braking force estimation section 24 includes, for example, a magnetic type braking force sensor 25 disposed in the electric actuator 1. However, an optical type, eddy current type, or capacitance type sensor other than the magnetic type sensor may be used as the braking force sensor 25.

The magnetic type braking force sensor 25 includes, for example, a magnetic target (not shown) and a magnetic sensor (not shown). When a counterforce of the braking force is transmitted to the braking force sensor 25, a part of the braking force sensor 25 elastically deforms, whereby the magnetic target and the magnetic sensor are displaced relative to each other in the axial direction. In response to the amount of the relative displacement, an output signal of the magnetic sensor, that is, a sensor output of the braking force sensor 25, changes.

When the braking force is cancelled, the axial relative position of the magnetic target relative to the magnetic sensor returns to the initial position due to elastic return of the part of the braking force sensor 25. The braking force estimation section 24 can estimate the braking force by checking the sensor output of the braking force sensor 25 against relationship setting portion in which a relationship between the sensor output and the counterforce of the braking force acting on the braking force sensor 25 is set. Specifically, the braking force estimation section 24 is configured with a circuit or function with which an estimated value of the braking force can be calculated upon reception of the sensor output of the braking force sensor 25, by using a LUT implemented by software or hardware, or a predetermined transform function contained in a library of software or hardware equivalent to this, etc. A torque sensor that detects a torque generated, during braking, at the electric motor 4, the feed screw mechanism of the linear motion mechanism 6, etc. may be used as the braking force sensor 25.

The calculator 20 controls the drive circuit 22 such that the target braking force commanded by the braking force command section 18a is achieved. The calculator 20 is composed of: a computer including a processor; and other electronic circuits such as a ROM (read only memory) including a program to be executed by the processor, a RAM (random access memory), and a co-processor. The calculator 20 has a function to output, to the ECU 18, various types of information such as various detected values and control values regarding the electric motor 4. The drive circuit 22 includes: an inverter 22b that converts DC power from the main power supply device 3 or the power storage device 21 described later into three-phase AC power that is to be used for driving the electric motor 4; and a PWM control section 22a that controls the inverter 22b.

The electric motor 4 is composed of a three-phase synchronous motor or the like. The electric motor 4 is provided with an angle sensor 26 that detects a rotation angle of a rotor that is not shown. For example, a resolver, an encoder, or the like is used as the angle sensor 26. The inverter 22b includes a plurality of semiconductor switching elements (not shown), and the PWM control section 22a performs a pulse width modulation of an inputted current command and provides an on/off command to each of the semiconductor switching elements, thereby controlling an operation of the electric motor 4.

According to the target braking force and the estimated value of the braking force, the calculator 20 converts these forces into a current command represented by a voltage value and provides, to the PWM control section 22a, a motor operation command value that is composed of the current command. The calculator 20 obtains, from a current detector 27, a motor current applied from the inverter 22b to the electric motor 4, and performs a current feedback control for the target braking force. In addition, the calculator 20 obtains a rotation angle of the electric motor 4 from the angle sensor 26, and provides a current command to the PWM control section 22a such that efficient motor driving corresponding to the rotation angle is enabled. Specifically, the calculator 20 is configured with a circuit or function with which the current command can be calculated upon reception of input of the target braking force and the estimated value of the braking force, and, as necessary, input of the motor current or the rotation angle of the rotor, by using a LUT implemented by software or hardware, or a predetermined transform function contained in a library of software or hardware equivalent to this, etc. The calculator 20 is provided with a power determination section 28 and a residual pressure cancellation section 29, which are described later.

The calculator 20 may have a sensor-less estimation function to estimate a rotation angle on the basis of a three-phase line voltage, not on the basis of the rotation angle detection by the angle sensor 26, for example. In addition, in the case where, for example, the electric motor 4 is a DC motor or a stepping motor that does not require a rotation angle detection, the angle sensor 26 may not be provided.

The main power supply device 3 is a mainly-used power supply and supplies power also to, for example, another drive source of the vehicle. The power storage device 21, which is a sub-power supply device, is dedicated for the electric brake device and used in cancelling a residual pressure of the braking force. The power storage device 21 stores power supplied from the main power supply device 3. For example, a capacitor such as a super capacitor, a battery such as a lithium ion secondary battery, or the like is used as the power storage device 21. In this example, the power storage device 21 is built in the inverter device 19. However, for example, the power storage device 21 may be equipped with and fixed to a part of the vehicle outside the inverter device 19. The main power supply device 3 and the power storage device 21 form a power supply device 30. The power storage device 21 is connected to the main power supply device 3 via the switch 23 and a current sensor 31.

Figure 4:
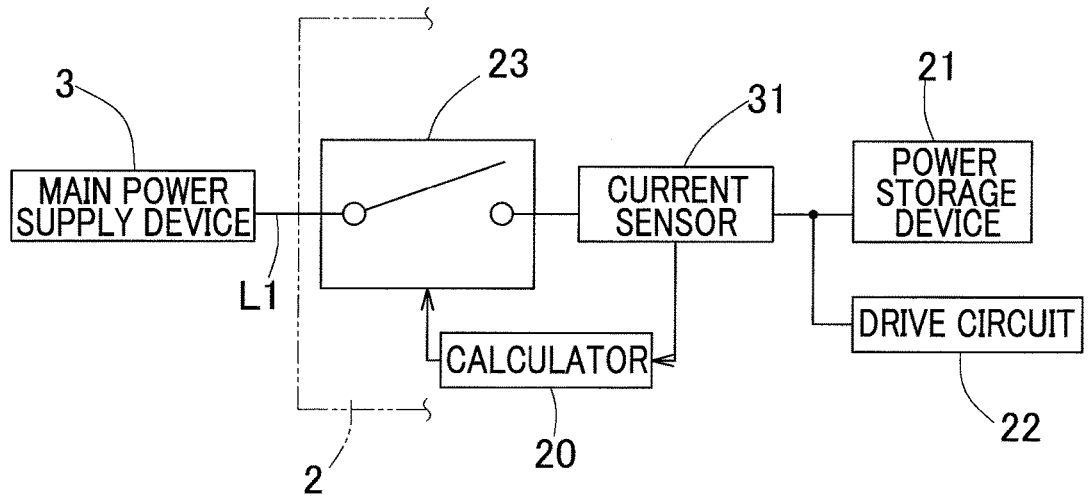
FIG. 4 is an enlarged view of a main part of FIG. 3.

FIG. 4 is an enlarged view around the switch 23. The switch 23 includes a switching element composed of, for example, a field-effect transistor (abbreviated as FET). For example, a magnetic field detection sensor that detects a magnetic field during current application, or a current sensor including a shunt resistor and an amplifier, may be used as the current sensor 31. Each of the switch 23 and the current sensor 31 is connected to the calculator 20.

The current sensor 31 is connected to the calculator 20, and a switch control signal (opening/closing signal) is inputted from the calculator 20 to the switch 23. The calculator 20 opens or closes the switch 23 according to a current detected by the current sensor 31. In a normal state, the switch 23 is ON, and power is supplied from the main power supply device 3 to the drive circuit 22 and the electric motor 4 (FIG. 3) subsequent to the drive circuit 22. When there is an abnormality in the main power supply device 3, a power line L1, or the like, for example, if the calculator 20 determines, on the basis of the current detected by the current sensor 31, that an amount of remaining power that can be supplied from the main power supply device 3 to the electric motor 4 (FIG. 3) has become equal to or less than a determined value, the calculator 20 makes the switch 23 OFF to break the connection between the controller 2 and the main power supply device 3.

Figure 5:
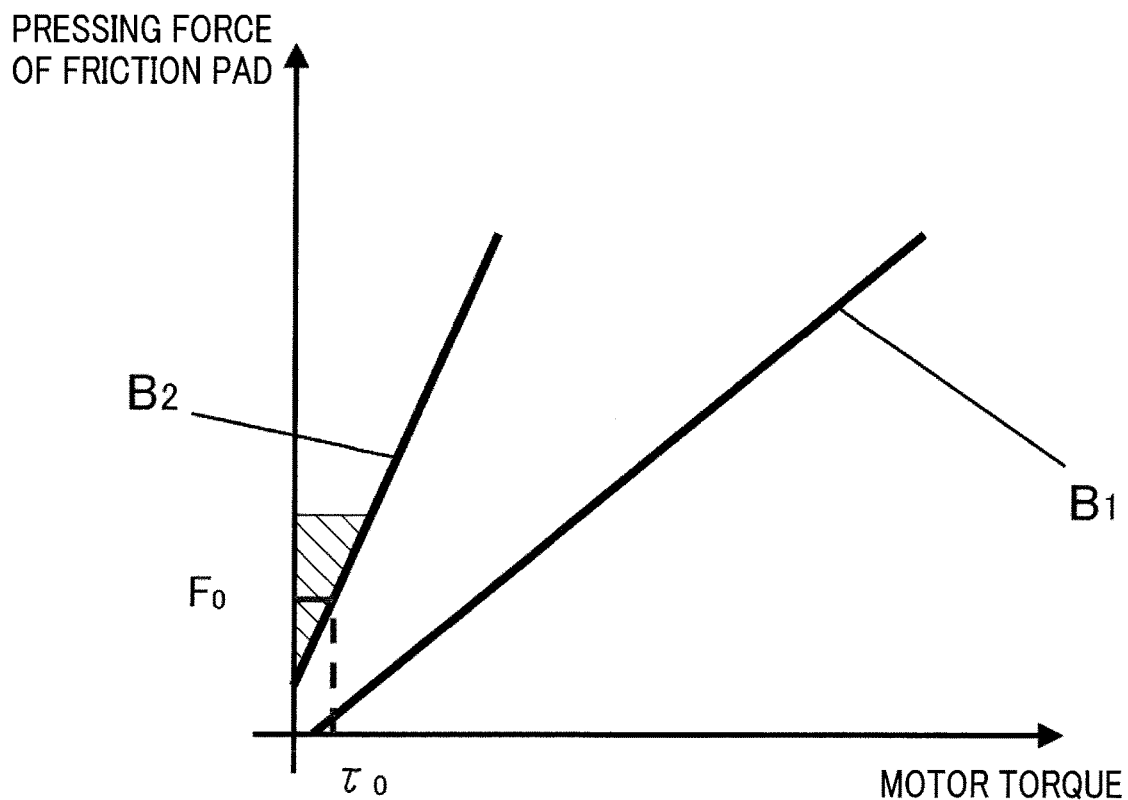
FIG. 5 is a diagram showing a correlation between a motor torque of the electric brake device and a pressing force of a friction pad.

Here, FIG. 5 is a diagram showing a correlation between a motor torque of the electric brake device and a pressing force of the friction pad 9 (FIG. 1). In FIG. 5, the horizontal axis (x-axis line) represents the motor torque, and the vertical axis (y-axis line) represents the pressing force of the friction pad 9 (FIG. 1). As an amount by which the brake pedal (not shown) is depressed increases, the target braking force commanded by the braking force command section 18a (FIG. 3) increases. As the target braking force increases, the motor torque increases. As the motor torque increases, the pressing force of the friction pad 9 (FIG. 1) increases along a forward or positive efficiency line B1.

After this operation, when the motor torque turns to decrease, the pressing force of the friction pad 9 (FIG. 1) decreases along a reverse efficiency line B2. If a torque generated when there is an abnormality in the main power supply device or the like is $\tau_0$, a pressing force $F_0$ of the friction pad 9 (FIG. 1) with respect to the torque $\tau_0$ on the reverse efficiency line B2 is a residual pressure occurring when there is the abnormality. When an abnormality occurs in the electric motor 4 (FIG. 3) due to an abnormality in the main power supply device 3 or the like, the residual pressure occurs due to hysteresis caused by a frictional force within the electric actuator 1.

The electric brake device of the present embodiment particularly cancels the residual pressure to prevent occurrence of unintentional braking force in the vehicle. As shown in FIG. 3, the calculator 20 further includes the power determination section 28 and the residual pressure cancellation section 29. On the basis of the current detected by the current sensor 31, the power determination section 28 determines whether the amount of remaining power that can be supplied from the main power supply device 3 to the electric motor 4 has become equal to or less than the determined value. Specifically, the power determination section 28 is configured with a circuit or function with which it can be determined whether the amount of remaining power has become equal to or less than the determined value, upon reception of input of the current value detected by the current sensor 31, by using a LUT implemented by software or hardware, or a predetermined transform function contained in a library of software or hardware equivalent to this, etc. When it is determined that the amount of remaining power has become equal to or less than the determined value, the residual pressure cancellation section 29 makes the switch 23 OFF to break the connection between the controller 2 and the main power supply device 3 as described above. Specifically, the residual pressure cancellation section 29 is configured with a circuit or function with which the switch 23 can be made OFF upon reception of the result of the determination of the power determination section 28, by using a LUT implemented by software or hardware, or a predetermined transform function contained in a library of software or hardware equivalent to this, etc.

As described above, the residual pressure cancellation section 29 cancels the residual pressure of the braking force by driving the electric motor 4 in a direction opposite to a brake pressing direction for pressing the brake, using the power remaining in the power storage device 21, such that the estimated value of the braking force obtained by the braking force estimation section 24 becomes equal to or less than a set value (e.g., a positive value close to zero). The residual pressure cancellation section 29 includes an elastic energy estimated value determination section 32, a motor loss estimated value calculation section 33, and a comparison calculation section 34.

On the basis of the rigidity and reverse efficiency of the electric brake device, the elastic energy estimated value determination section 32 determines an estimated value of elastic energy inputted to the electric motor 4 in a range in which the estimated value of the braking force obtained by the braking force estimation section 24 shifts from the target braking force to the set value or lower. The "rigidity" is determined, for example, on the basis of a correlation between a deformation amount of a brake caliper or the friction pad and an axial load of the conversion mechanism 6. Specifically, the elastic energy estimated value determination section 32 is configured with a circuit or function with which the estimated value of elastic energy can be calculated upon reception of input of the rigidity and the reverse efficiency of the electric brake device, by using a LUT implemented by software or hardware, or a predetermined transform function contained in a library of software or hardware equivalent to this, etc.

The elastic energy inputted to the electric motor 4 in the range depends on the rigidity and the area of a triangle (see a hatched portion in FIG. 5) surrounded by the reverse efficiency line B2, a straight line extending from a point thereon corresponding to a predetermined motor torque to zero and parallel to the x-axis line, and the y-axis line as shown in FIG. 5. Thus, for example, in advance, a test, an experiment, simulation calculation, or the like is performed to determine a correlation between the motor torque and the pressing force of the friction pad 9 and the rigidity, and a table or a map for estimating elastic energy is created. The elastic energy estimated value determination section 32 can estimate the elastic energy, for example, by dividing the braking force estimated by the braking force estimation section 24 shown in FIG. 3 by a road surface frictional coefficient μ to correct an error or the like and to convert the divided braking force to a pressing force, and checking the pressing force against the map to obtain a motor torque and a deformation amount of the brake caliper or the friction pad.

The motor loss estimated value calculation section 33 obtains an estimated value of motor loss that occurs when a determined torque is continuously exerted in the range. The motor loss estimated value calculation section 33 can estimate the estimated value of motor loss, for example, on the basis of: an external force required for rotating the electric motor 4 in a brake releasing direction for releasing the brake when there is an abnormality in the power supply device 30; and a motor rotation angle required until the braking force is reduced to about zero or lower. The motor loss estimated value calculation section 33 may estimate the estimated value of motor loss on the basis of the motor rotation angle in the range, the maximum value of a cogging torque of the electric motor 4, and a determined rolling friction resistance value. Specifically, the motor loss estimated value calculation section 33 is configured with a circuit or function with which the estimated value of motor loss can be calculated upon reception of input of the external force, the motor rotation angle, the maximum value of the cogging torque of the electric motor 4, the determined rolling friction resistance value, or the like by using a LUT implemented by software or hardware, or a predetermined transform function contained in a library of software or hardware equivalent to this, etc.

The comparison calculation section 34 controls the electric motor 4 such that the braking force is achieved which satisfies the condition that the sum of the estimated value of elastic energy determined by the elastic energy estimated value determination section 32 and the estimated value of motor loss calculated by the motor loss estimated value calculation section 33 does not exceed the amount of power for which the determination is performed by the power determination section 28. Thus, the braking force can be assuredly reduced to about zero or lower. Specifically, the comparison calculation section 34 is configured with a circuit or function with which, upon reception of input of the estimated value of elastic energy determined by the elastic energy estimated value determination section 32 and the estimated value of motor loss calculated by the motor loss estimated value calculation section 33, these values can be summed and a braking force, which satisfies that the sum of these values does not exceed the amount of power for which the determination is performed by the power determination section 28, can be calculated, by using a LUT implemented by software or hardware, or a predetermined transform function contained in a library of software or hardware equivalent to this, etc.

FIGS. 6A and 6B show examples in which an abnormality occurs in the power supply device. Hereinafter, a description will be given also with reference to FIG. 3. FIG. 6A shows an example in which an abnormality occurs in the main power supply device 3 in the electric brake device according to the present embodiment which includes the power storage device 21. FIG. 6B shows an example in which an abnormality occurs in a power supply device of an electric brake device that does not include a power storage device. Each of the examples of FIGS. 6A and 6B shows the case where the abnormality occurs in the power supply device at a time of zero while predetermined braking forces are exerted respectively, and an amount of power that can be supplied from the power supply device decreases.

Each of the upper charts of FIGS. 6A and 6B shows transition of an actual braking force Fr with respect to a predetermined target braking force Fm that is continuously maintained even after the time of zero. As shown in the upper chart of FIG. 6A, in the electric brake device of the embodiment, the braking force Fr shifts to zero with passage of time, by using the residual pressure cancellation section 29 of the controller 2, etc. Meanwhile, in the upper chart of FIG. 6B, a residual pressure $F_0$ occurs due to hysteresis after the abnormality occurs in the power supply device.

In each of the lower charts of FIGS. 6A and 6B, each of the solid lines represents an amount of remaining power that can be supplied from the power supply device. Motor loss (a broken line) that occurs until the braking force Fr is reduced to about zero makes a transition similar to the transition of the actual braking force Fr (the braking force estimated by the braking force estimation section) shown in each upper chart. That is, in the lower chart of FIG. 6A, the motor loss shifts to zero with passage of time. Meanwhile, in the lower chart of FIG. 6B, the motor loss reduces with passage of time, but after a certain time, the motor loss shifts so as to be maintained at a certain value.

In addition, in each of the lower charts of FIGS. 6A and 6B, a single dotted line represents an estimated value of elastic energy inputted to the electric motor 4 due to counteraction, of the elastic energy of the electric brake device in a state where the braking force at that time is exerted. In the lower chart of FIG. 6A, the comparison calculation section 34 reduces the braking force such that the sum of the motor loss and the estimated value of elastic energy does not exceed the amount of remaining power that can be supplied, thereby causing the actual braking force Fr to shift finally to about zero. Meanwhile, in the lower chart of FIG. 6B, the sum of the motor loss and the estimated value of elastic energy exceeds the amount of power that can be supplied, and thus, after that, the residual pressure $F_0$ occurs.

Figure 7:
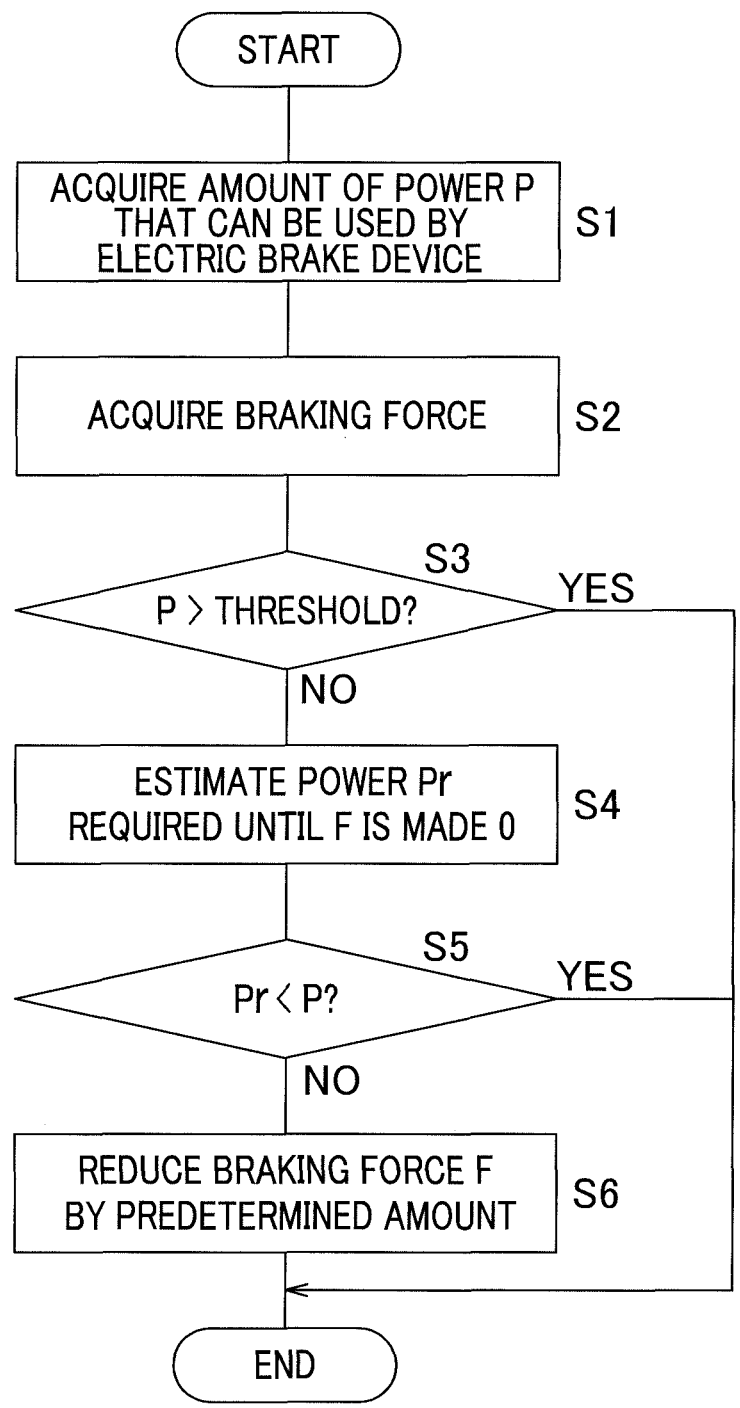
FIG. 7 is a flowchart showing a concept of operation flow of the electric brake device.

FIG. 7 is a flowchart showing a concept of operation flow of the electric brake device. For example, this process starts under a condition that the power of the vehicle is turned on, and the power determination section 28 of the controller 2 acquires an amount of power P that can be used by the electric brake device (step S1). Next, the residual pressure cancellation section 29 acquires a braking force F estimated by the braking force estimation section 24 (step S2).

The power determination section 28 determines whether the acquired amount of power P is greater than a threshold (step S3). When it is determined that the amount of power P is greater than the threshold (step S3: yes), this process is ended. When it is determined that the amount of power P is equal to or less than the threshold (step S3: no), the residual pressure cancellation section 29 estimates power Pr required until the braking force is made zero (step S4). The residual pressure cancellation section 29 determines whether the power Pr is less than the amount of power P that can be used (step S5).

When it is determined that the power Pr is less than the amount of power P (step S5: yes), this process is ended. When it is determined that the power Pr is equal to or greater than the amount of power P (step S5: no), the residual pressure cancellation section 29 drives the electric motor 4 in the direction opposite to the brake pressing direction, to reduce the braking force F by a predetermined amount (step S6). Thereafter, this process is ended.

According to the electric brake device described above, when the amount of remaining power for which the determination can be performed by the power determination section 28 has become equal to or less than the determined value due to, for example, an abnormality in the main power supply device 3 or the power line L1, the residual pressure cancellation section 29 controls driving of the electric motor 4 in the direction opposite to the brake pressing direction such that the estimated value of the braking force becomes equal to or less than about zero. Accordingly, occurrence of unintentional braking force in the vehicle equipped with the electric brake device can be prevented, so that deterioration of the gas mileage or electric mileage of the vehicle can be prevented. In addition, generation of excessive heat in the brake rotor 8 is prevented to allow the vehicle to continue to run.

When the calculator 20 determines that the remaining power that can be supplied from the main power supply device 3 to the electric motor 4 has become equal to or less than the determined value, the calculator 20 makes the switch 23 OFF to break the connection between the controller 2 and the main power supply device 3. Accordingly, the residual pressure cancellation section 29 drives the electric motor 4 by using the power remaining in the power storage device 21, which is the sub-power supply device, to cancel the residual pressure of the braking force. Since the residual pressure of the braking force is cancelled by using the power storage device 21 different from the main power supply device 3 as described above, redundancy can be ensured. In the case where a controller and a plurality of electric actuators are connected to a power supply device of one system, a measure is preferably taken such that, for example, the capacity of the power storage device 21 is an amount that allows the electric brake device to operate for a predetermined time, when an abnormality occurs in the power supply device.

Figure 8:
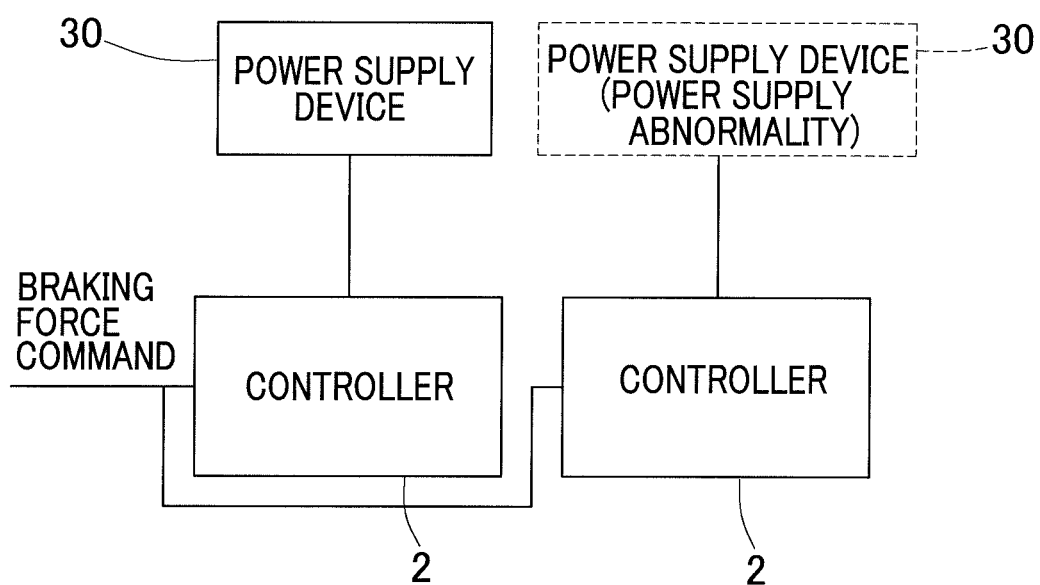
FIG. 8 is a block diagram showing a schematic configuration of a control system of an electric brake device according to another embodiment of the present invention.

As another embodiment, as shown in FIG. 8, the power storage device may not be provided. In this case, generally, to ensure redundancy, a plurality of electric brake devices are conceivable of having power supply devices 30 of different systems, respectively. Thus, in the vehicle, the present invention can be applied to the electric brake device that includes an electric motor and a controller connected to the power supply device 30 in which an abnormality has occurred, and the other electric brake device can be normally operated by the power supply device 30 of the other system.

In addition, there is a possibility that a residual pressure occurs due to fluctuations in a parameter such as the rolling resistance of the electric motor 4. As a countermeasure against this, the residual pressure cancellation section 29 may be additionally provided with a threshold for emergency residual pressure cancellation in which the electric motor 4 is caused to monotonously rotate in the brake releasing direction when the amount of remaining power for which the determination can be performed by the power determination section 28 has become equal to or less than the determined value. In this case, the residual pressure of the braking force can be cancelled, and also a load of arithmetic processing on the controller 2 can be reduced by simplifying the control system.

The vehicle may be an electric vehicle whose drive wheels are driven by motors, or may be a hybrid vehicle in which one of each front wheel and each rear wheel is driven by an engine and the other is driven by a motor. In addition, an engine vehicle whose drive wheels are driven by only an engine may be used as the vehicle. The brake type may be a disc brake type or a drum brake type.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

REFERENCE NUMERALS

2 . . . controller
3 . . . main power supply device
4 . . . electric motor
6 . . . linear motion mechanism (conversion mechanism)
8 . . . brake rotor
9 . . . friction pad
18a . . . braking force command section
21 . . . power storage device (sub-power supply device)
24 . . . braking force estimation section
28 . . . power determination section
29 . . . residual pressure cancellation section
30 . . . power supply device
32 . . . elastic energy estimated value determination section
33 . . . motor loss estimated value calculation section
34 . . . comparison calculation section

What is claimed is:

1. An electric brake device comprising:
an electric motor;
a brake rotor configured to rotate integrally with a wheel;
a friction pad configured to come into contact with the brake rotor to generate a braking force;
a conversion mechanism configured to convert a rotary motion of the electric motor into an advancing or retracting motion of the friction pad;
a braking force command section configured to set a target braking force;
a braking force estimation section configured to obtain an estimated value of the braking force generated by pressing the friction pad against the brake rotor;
a controller configured to drive the electric motor such that the target braking force set by the braking force command section is achieved; and
a power supply device configured to supply power to each of the controller and the electric motor, wherein
the controller includes
a power determination section configured to determine whether an amount of remaining power that can be supplied from the power supply device to the electric motor has become equal to or less than a determined value, and
a residual pressure cancellation section configured to drive the electric motor in a direction opposite to a brake pressing direction such that the obtained estimated value of the braking force becomes equal to or less than a set value to cancel a residual pressure of the braking force, when the power determination section determines the amount of remaining power has become equal to or less than the determined value; and
the residual pressure cancellation section includes
an elastic energy estimated value determination section configured to determine an estimated value of elastic energy occurred in the electric motor in a range in which the estimated value of the braking force obtained by the braking force estimation section shifts from the target braking force to the set value or lower,
a motor energy loss estimated value calculation section configured to obtain an estimated value of motor energy loss that occurs when a determined torque is continuously exerted in the range, and
a comparison calculation section configured to control the electric motor such that the braking force is achieved which satisfies a condition that a sum of the estimated value of elastic energy determined by the elastic energy estimated value determination section and the estimated value of motor energy loss calculated by the motor energy loss estimated value calculation section does not exceed electric energy for which the determination is performed by the power determination section.

2. The electric brake device as claimed in claim 1, wherein the motor energy loss estimated value calculation section estimates the estimated value of motor energy loss on the basis of a motor rotation angle in the range, a maximum value of a cogging torque of the electric motor, and a determined rolling friction resistance value.

3. The electric brake device as claimed in claim 1, wherein the residual pressure cancellation section is additionally provided with a threshold for an emergency residual pressure cancellation in which the electric motor is caused to rotate in a brake releasing direction with a continuous intensity when the electric energy for which the determination is performed by the power determination section has become equal to or less than the determined value.

4. The electric brake device as claimed in claim 1, wherein
- the power supply device includes a main power supply device to be used and a sub-power supply device to be used in cancelling the residual pressure of the braking force, and
- when the power determination section determines that the remaining power to be supplied from the main power supply device to the electric motor has become equal to or less than the determined value, the residual pressure cancellation section breaks a connection with the main power supply device, and drives the electric motor by using power remaining in the sub-power supply device, to cancel the residual pressure of the braking force.

\* \* \* \* \*